G. H. DUNLOP.
EXCAVATING SCOOP.
APPLICATION FILED MAR. 24, 1904.
No. 915,750.
Patented Mar. 23, 1909.
2 SHEETS—SHEET 1.
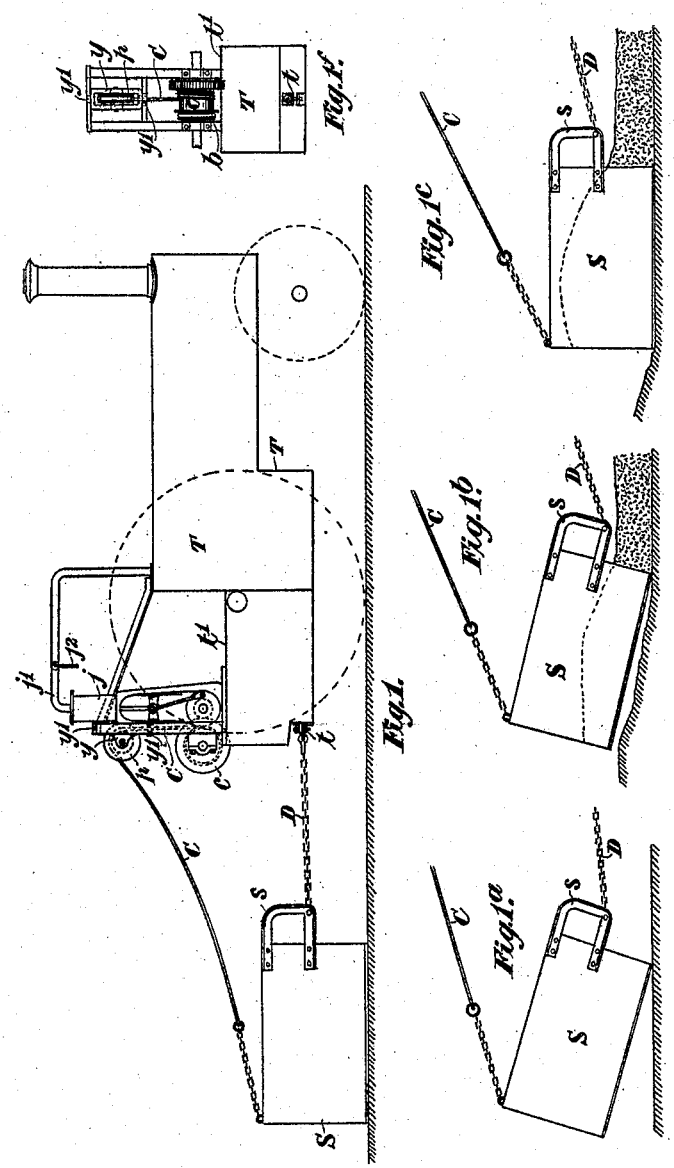

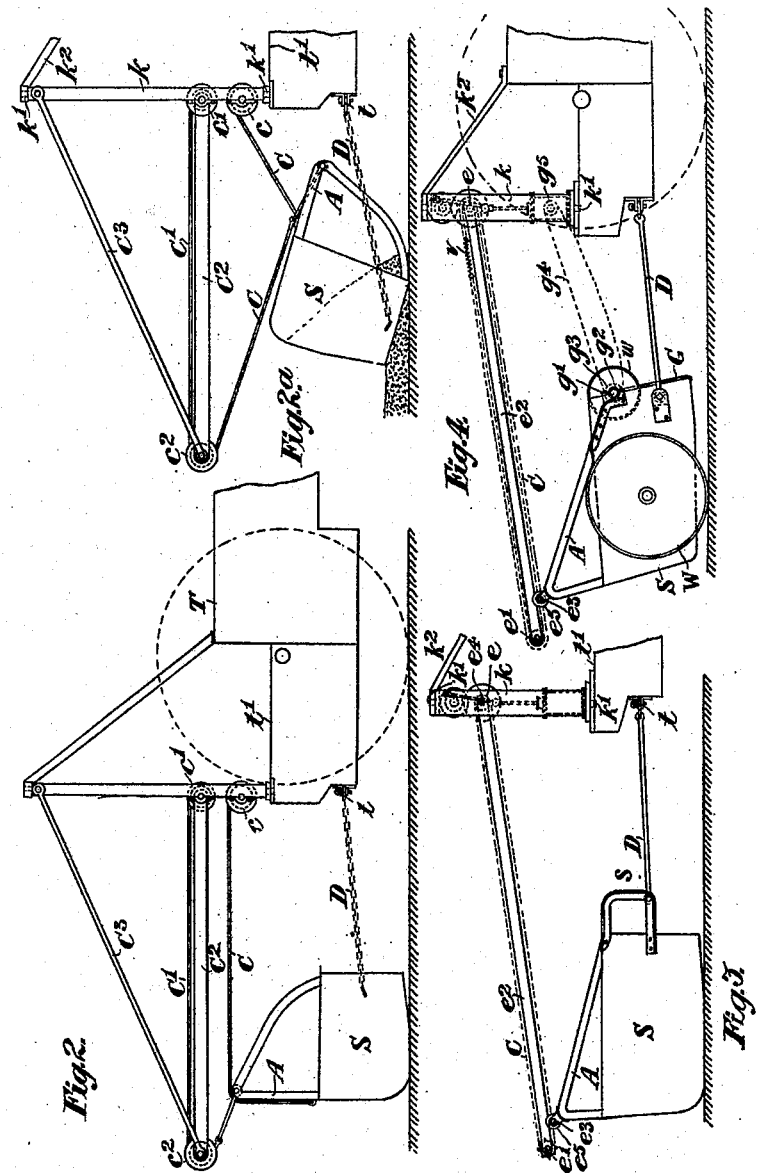

UNITED STATES PATENT OFFICE.

GEORGE HENRY DUNLOP, OF SOUTH MELBOURNE, VICTORIA, AUSTRALIA.

EXCAVATING-SCOOP.

No. 915,750.          Specification of Letters Patent.          Patented March 23, 1909.

Application filed March 24, 1904. Serial No. 199,764.

*To all whom it may concern:*

Be it known that I, GEORGE HENRY DUNLOP, a subject of the King of Great Britain and Ireland, residing at No. 17 Dundas Place, South Melbourne, in the British State of Victoria, Commonwealth of Australia, civil engineer, have invented a new and useful Excavating-Scoop, of which the following is a specification.

This invention relates to an improved scoop for excavating and conveying earth and other materials.

The invention consists essentially of a tractor, a scoop, a main hauling line of communication from the tractor to the scoop, and a controlling line of communication, simple or duplex, from an attachment at or upon the rear of the tractor to the scoop, together with operating mechanism for adjusting the position of the scoop by tilting it forward or backward for the varying positions necessary in the cycle of operations comprising filling, conveying to the dump, dumping, returning the scoop to the place where it is again to be filled, and setting the scoop ready for filling. These aforesaid four parts will usually be referred to respectively as the tractor, the scoop, the draft line, and the controlling line. The tilting of the scoop is effected by varying the length of the controlling line, or the length of the draft line, or the lengths of both of them, by means of hand-driven or power-driven operating mechanism.

In this specification "forward" shall mean that direction in which the scoop is drawn when it is being filled, and "backward" shall mean the contrary direction; the "dump" shall mean the place where the excavated material contained in the scoop is to be deposited, and "dumping" shall mean depositing the contents of the scoop there. The term scoop shall mean and include the appliance sometimes called a scraper. Except when otherwise indicated the terms "draft line" and "controlling line" shall include the mechanism for operating them.

The tractor may be any suitable vehicle mechanically propelled or drawn by animal power. Hereinafter the tractor is assumed to be a steam traction engine, but it may be an animal drawn vehicle by which the scoop is hauled and from which it is controlled. It is intended that traction engines of various usual constructions may be used as tractors in this method for excavating and conveying; and as it is desired that this use shall be practicable with as little alteration or addition to their structure as possible, different constructions of draft lines and of controlling lines are shown, in order that choice may be made of that which can most readily be used with the tractor available. Also the form of scoop being most suitable for any particular work may render one type of draft line or of controlling line more suitable than another.

The scoop is a receptacle for the earth and other materials similar to the scoops hitherto known in other methods for excavating. The scoop may be fitted either with runners upon which to slide or with wheels to facilitate draft. At the sides of the scoop, at the mouth or open front, brackets or lugs or alternatively wheels may be fitted onto which the scoop is tilted forward for dumping. With certain forms of scoops these brackets or wheels are not necessary. When the length of the scoop along the cutting edge from side to side is very great an intermediate rib or ribs may be used within the bowl of the scoop so as to strengthen it; and part of the draft may be applied to such ribs. In scoops having wheels the front or mouth may be splayed out, or have splayed pieces fitted to the sides, so as to fill and clear away a sufficient width at each side to allow the wheels to travel freely on the ground excavated and cleared by the scoop.

The draft line from the tractor to the scoop may consist of chains, bars, bridles, or bails such as are used with animal-drawn scoops or with the buckets of steam excavating shovels. The draft line is connected to the tractor at one point on its center line, in order to facilitate draft and steering, with a universal joint or an equivalent construction which will permit the draft line to swing upward and downward and laterally. The draft line is connected to the scoop at the sides, and if necessary to intermediate ribs as hereinafter described. The controlling line in this method of working takes the place and effects the purpose of, or is combined with, the hand-operated controlling appliances used with animal drawn scoops. The controlling line is connected at the tractor at one central part, or is connected to a frame-work on the draft line and not directly to the tractor. It is evident however that the scoop can be drawn and controlled by lines of communication extending forward direct from the sides of the scoop to the tractor, and not connected centrally to it.

The draft line and the controlling line are fitted to the tractor so that the machinery can travel freely along curves, but it will be convenient to fill and to dump when it is moving forward in a straight line or nearly so.

The controlling line or the draft line or both of them have operating mechanism for lengthening and shortening them for tilting the scoop.

Hereinafter the method for excavating and conveying is described as used for earthwork. When necessary the ground may be loosened as by plowing. In order that the loosened ground may not be again consolidated by repeated traffic of the tractor and the scoop over it, the plowing may be done in strips of convenient length, and of width about equal to the distance which the scoop must be drawn to fill it. The scoop is filled by drawing it across this strip, and in this way the plowed land is only subjected to the consolidation due to one passage of the tractor hauling the scoop across the strip as it is being filled.

In the following descriptions of working it is assumed that there is an attendant, hereinafter called the driver, to operate the tractor; and another attendant, hereinafter called the scoopman, to operate the scoop.

In the accompanying drawings the letters of reference are employed to indicate corresponding parts.

Figure 1 shows in side elevation the tractor,—an ordinary steam traction engine— and the scoop connected with it by the draft line and the controlling line. Fig. 1$^a$ shows the scoop in initial filling position, Figs. 1$^b$ and 1$^c$ are similar views to Fig. 1$^a$, except that the scoop is tilted farther backward: Fig. 1$^f$ is a rear view of the operating mechanism for the controlling line. Figs. 2 and 2$^a$ show in side elevation part of a tractor, a scoop in conveying and dumping positions, the draft line and the controlling line of two ropes combined with a projecting strut. Fig. 3 shows in side elevation the scoop with arm and brackets. In this figure the draft line is a rigid bail, and the controlling line consists of an endless sprocket chain combined with a strut. Fig. 4 is a view similar to Fig. 3 except that the scoop is fitted with main carrying wheels, and smaller wheels in lieu of the brackets, and an end-gate and sprocket wheels and chain for operating it.

In Fig. 1 the tractor T is an ordinary steam road locomotive traction engine having a draft ring $t$ for attachment of the draft line, and a platform as $t^1$ at the back upon which the driver and the scoopman stand. The scoop S is a flat bottomed approximately rectangular receptacle having projecting brackets or lugs $s$ one at each side at the mouth or open front of the scoop. The draft line D consists of a pair of chains passing from the draft ring $t$ one to each bracket $s$ at the sides of the scoop. The controlling line C consists of a single wire rope connected by a pair of chains to the top of the scoop at the back and passing forward over a wheel or guide pulley $p$ at the tractor to a winding drum $c$ suitably supported on the platform $t^1$, together with a double cylinder vertical engine $j$ by which it can be rotated. The winding drum $c$ is fitted with a brake $b$ and also with an ordinary clutch and the vertical engine cylinders are supplied with steam through the pipe $j^1$ from the boiler of the traction engine, and said pipe has a valve operated by a handle $j^2$. The winding engine is fixed on the platform $t^1$, the guide pulley $p$ is fitted with bearings in a yoke or frame $y$, having bearings $y^1$, so that the guide pulley $p$ and the yoke $y$ can swing on the pivots. The guide pulley $p$ the drum $c^1$ the yoke $y$ and the bearings $y^1$ are shown by another view in Fig. 1$^f$. The direction of the rope C from the guide pulley $p$ to the drum $c$ should be in a vertical plane and at right angles to the direction of travel of the machinery, or nearly so, in order that the outer part of the rope C and the pulley $p$ may swing freely laterally. When the scoop is hauled to the place where the earth is to be filled it is tilted forward as required, by inwinding the controlling line C, into the position about as shown in Fig. 1$^a$ so that it bears upon the ground at the front on the cutting plate. As the tractor moves forward drawing the scoop after it the scoop sinks into the ground as shown in Fig. 1$^b$. The controlling line C is gradually unwound from the drum $c$, under control of the brake, so that when the scoop has cut down into the ground to the desired depth it has also been allowed to fall back on its flat bottom to the position shown in Fig. 1$^c$. In this position the scoop is drawn along until it is filled. In order to keep the cutting edge sunk to the proper depth in the ground until the scoop is filled a sufficient tension may be maintained in the controlling line so as to concentrate part of the weight of the scoop and its contents toward the front on the cutting plate. When the scoop is filled this controlling line may be slackened and the scoop is hauled away by the tractor to the dump in the position shown in Fig. 1. At the dump the controlling line C is hauled in on the winding drum and the scoop is tilted forward until it rests upon the brackets $s$ and it is then drawn along in this position until all of the contents have dropped out and been deposited. The empty scoop may now be drawn away in this position to the place where it is to be again filled, and be there allowed to drop back by unwinding the controlling line C until it is in the position shown in Fig. 1ª ready for filling; or the scoop may be allowed to drop back by unwinding the controlling line C until the scoop is in the position shown in Fig. 1, and it may then be drawn away to the place where it is again to be filled. The controlling line C is hauled by winding it upon the drum c by means of the winding engine, the scoop may be held tilted in any position by means of the brake b applied to the drum c, and may be allowed to fall back to more backward tilted positions by allowing the rope C to unwind from the drum c under control of the brake. It is evident that the scoop can be hauled by the tractor along curves freely, because the draft line can swing laterally at the draft ring and the guide pulley p and the yoke y can swing laterally in the bearings $y^1$.

In Figs. 2 and 2ª there is shown part of the tractor, the scoop furnished with the arm A in conveying and in dumping position, the draft line D which consists of a pair of chains, and the controlling line which consists of a pair of ropes C and $C^1$ passing from the arm A on the scoop to winding drums c and $c^1$ respectively, supported on a pivoted framing K. The ropes C and $C^1$ are combined with a strut $C^2$ provided with a back tie $C^3$ supporting the outer end of the strut from the framing K, and bearing a guide pulley $c^2$ at the outer end. The rope C passes from the arm to the winding drum c and the rope $C^1$ passes backward from the arm A around the guide pulley $c^2$ and thence to the drum $c^1$. The scoop is controlled throughout the cycle of operations for removing a scoopful of earth substantially as already described.

In the scoop shown in Figs. 2 and 2ª the rope C is connected to the scoop not at the top of the arm but lower down at the back of the scoop, so that the scoop may be overturned farther forward for dumping. In such case the strut $C^2$ may be connected to the scoop by means of a link or links extending for a sufficient short distance from the point of attachment to the scoop. The connecting chains of the rope C will travel and be guided within the links.

Fig. 3 shows in side elevation part of the tractor, the scoop having an arm and brackets in conveying and in dumping position, the draft line consisting of a rigid bail or bridle, and the controlling line consisting of an endless sprocket chain C supported on sprocket wheels e and $e^1$ at the ends of a strut $e^2$ and secured to the top of the arm by a pin $e^3$. The strut is connected to the operating mechanism of the controlling line at the pin $e^4$ upon which the sprocket e revolves and rests upon the rollers $e^5$ at the top of the arm which rollers rotate upon the pin $e^3$. The whole controlling line including the operating mechanism is so mounted that it can swing laterally as required as already described. The scoop is tilted forward or backward by rotating the sprocket wheel e either way by means of suitable power such as a pair of engines fitted with reversing gear and is held tilted in any desired position by means of a brake applied to said sprocket wheel e. A spring as v see Fig. 4 may be fitted in the chain C so as to maintain it taut each way and prevent jar or shock when the direction of motion of the chain C is suddenly reversed. Also the strut $e^2$ may be counterweighted so as to rest lightly upon the bearing at the top of the arm.

Fig. 4 shows a construction similar to that in Fig. 3 except that the scoop has main wheels W to facilitate transport and smaller wheels w in lieu of the brackets while the draft line is a rigid bail. The use of a rigid bail or bridle will always be advisable with scoops fitted with traveling wheels because with a flexible draft line the scoop might outrun the tractor and collide with it as when descending slopes. The scoop shown in this figure is furnished with an end-gate G.

I claim—

1. The combination of a tractor, a scoop, a draft line from the tractor to the scoop and a double flexible controlling line from the tractor to the scoop together with a strut and operating mechanism whereby earth and other materials can be filled into the scoop, conveyed in it, and dumped from it, substantially as herein described.

2. The combination of a tractor, a scoop, a draft line from the tractor to the scoop and a flexible endless controlling line together with a strut and operating mechanism whereby earth and other materials can be filled into the scoop conveyed in it and dumped from it substantially as herein described.

3. The combination of a tractor, a scoop, a draft line from the tractor to the scoop and a controlling line consisting of a strut from the tractor to the scoop and operating mechanism whereby earth and other materials can be filled into the scoop, conveyed in it and dumped from it substantially as herein described.

4. The combination of a tractor, a scoop, an extensible draft line from the tractor to the scoop and operating mechanism and a rigid controlling line of fixed length from the tractor to the scoop whereby earth and other materials can be filled into the scoop conveyed in it, and dumped from it substantially as herein described.

5. The combination of a tractor, a scoop, and an extensible draft line from the tractor to the scoop with operating mechanism and an extensible controlling line from the tractor to the scoop with operating mechanism whereby earth and other materials can be filled into the scoop, conveyed in it, and dumped from it substantially as herein described.

6. The combination of a tractor, a scoop with an arm or projection thereon hauled by the tractor by means of a draft line and controlled from the tractor by means of a controlling line which is connected to the arm substantially as and for the purpose herein described.

7. In machinery for excavating and conveying earth and other materials a scoop with brackets or lugs thereon having a tilting bar connected to the brackets for assisting to tilt the scoop backward from the dumping position substantially as herein described.

8. The combination of a tractor, a scoop, hauled by the tractor by means of a draft line and controlled from the tractor by means of a controlling line, fitted with wheels at its mouth or open front and onto which wheels the scoop may be tilted forward, substantially as herein described.

9. The combination of a tractor, a scoop, hauled by the tractor by means of a draft line and controlled from the tractor by means of a controlling line furnished with an end-gate to prevent escape of the material conveyed therein constructed and operated substantially as herein described.

10. The combination of a tractor, a wheeled scoop, a draft line from the tractor to the scoop, and a double acting controlling line having a latch line whereby earth and other materials can be filled into the scoop conveyed in it and dumped from it substantially as herein described.

11. The combination of a tractor, a wheeled scoop hauled by the tractor by means of a draft line and controlled from the tractor by means of a double acting controlling line furnished with latch and lever gear whereby earth and other materials can be filled into the scoop conveyed in it and dumped from it substantially as herein described.

12. The combination of a tractor, a scoop, a draft line from the tractor to the scoop, a framework connected to the draft line, and a controlling line with operating mechanism whereby earth and other materials can be filled into the scoop, conveyed in it, and dumped from it, substantially as herein described.

13. In machinery for excavating and conveying earth and other materials comprising a scoop and a rib within the bowl of the scoop substantially as herein described.

14. The combination of a tractor, a scoop having a rib and a draft line connecting the scoop with the tractor, part of said line being connected with the rib.

15. The combination of the tractor, a scoop, means connecting the scoop with the said tractor and a holding down bar extending from the tractor to the scoop.

In witness whereof I have hereunto set my hand in presence of two witnesses.

GEORGE HENRY DUNLOP.

Witnesses:
BEDLINGTON BODYCOMBS,
JOHN EDWARD DELBRIDGE.